US012810590B2

(12) United States Patent
Petro et al.

(10) Patent No.: US 12,810,590 B2
(45) Date of Patent: Nov. 24, 2026

(54) AUTONOMOUS WEED TREATING DEVICE

(71) Applicant: DANDY TECHNOLOGY LLC, Boston, MA (US)

(72) Inventors: Douglas Petro, Winthrop, MA (US); Brad Steiner, San Francisco, CA (US); Trevor Hoffman, Boston, MA (US); Samuel Cranford, Hampton, NH (US)

(73) Assignee: Dandy Technology LLC, Boston, MA (US)

(*) Notice: Subject to any disclaimer, the term of this patent is extended or adjusted under 35 U.S.C. 154(b) by 581 days.

(21) Appl. No.: 18/217,211

(22) Filed: Jun. 30, 2023

(65) Prior Publication Data

US 2024/0032525 A1 Feb. 1, 2024

Related U.S. Application Data

(60) Provisional application No. 63/393,118, filed on Jul. 28, 2022.

(51) Int. Cl.
*G05D 101/15* (2024.01)
*A01M 21/04* (2006.01)
(Continued)

(52) U.S. Cl.
CPC ........... *G06V 10/774* (2022.01); *A01M 21/04* (2013.01); *G05D 1/0246* (2013.01); *G05D 1/243* (2024.01);
(Continued)

(58) Field of Classification Search
CPC .... G06V 10/774; G06V 10/82; G06V 20/188; G06V 20/56; A01M 21/04;
(Continued)

(56) References Cited

U.S. PATENT DOCUMENTS 10,390,497 B2 8/2019 Redden
10,772,253 B2 9/2020 Calleija et al.
(Continued)

FOREIGN PATENT DOCUMENTS

CN 109769419 A 5/2019
CN 110150260 A 8/2019
(Continued)

OTHER PUBLICATIONS

Jeremy Jordan, "Convolutional Neural Networks", Jul. 2017, retrieved online URL:<https://www.jeremyjordan.me/convolutional-neural-networks/> (Year: 2017).*
(Continued)

*Primary Examiner* — Jonathan Michael Skrzycki
(74) *Attorney, Agent, or Firm* — Becker Patent Law, LLC

(57) ABSTRACT

An autonomous weed treating device for treating weeds on grassy terrain has a chassis and a plurality of rotating members driven to move the chassis along the grassy terrain. The device includes a camera to acquire images of the grassy terrain and a dispenser to dispense a substance, such as a herbicide. A processing circuit drives the rotating members to move the chassis along the grassy terrain, processes the images to identify a weed, and controls the dispenser to dispense the substance on the weed.

13 Claims, 7 Drawing Sheets

(51) Int. Cl.

| | |
|---|---|
| ***G05D 1/00*** | (2024.01) |
| ***G05D 1/243*** | (2024.01) |
| ***G06T 7/00*** | (2017.01) |
| ***G06V 10/774*** | (2022.01) |
| ***G06V 10/82*** | (2022.01) |
| ***G06V 20/10*** | (2022.01) |
| ***G06V 20/56*** | (2022.01) |
| *A01C 23/00* | (2006.01) |
| *G05D 1/229* | (2024.01) |
| *G05D 107/20* | (2024.01) |
| *G05D 109/10* | (2024.01) |
| *G05D 111/10* | (2024.01) |

(52) U.S. Cl.

CPC ............ *G06T 7/0012* (2013.01); *G06V 10/82* (2022.01); *G06V 20/188* (2022.01); *G06V 20/56* (2022.01); *A01C 23/008* (2013.01); *G05D 1/2295* (2024.01); *G05D 2101/15* (2024.01); *G05D 2107/23* (2024.01); *G05D 2109/10* (2024.01); *G05D 2111/10* (2024.01); *G06T 2207/20081* (2013.01); *G06T 2207/20084* (2013.01); *G06T 2207/30188* (2013.01); *G06T 2207/30252* (2013.01)

(58) Field of Classification Search

CPC ... A01M 21/043; G05D 1/0246; G05D 1/243; G05D 1/2295; G05D 2101/15; G05D 2107/23; G05D 2109/10; G05D 2111/10; G05D 1/648; G05D 2105/15; G06T 7/0012; G06T 2207/20081; G06T 2207/20084; G06T 2207/30188; G06T 2207/30252

See application file for complete search history.

(56) References Cited

U.S. PATENT DOCUMENTS

| | | | | |
|---|---|---|---|---|
| 11,256,255 | B2 | 2/2022 | He et al. | |
| 2019/0278269 | A1 * | 9/2019 | He | G05D 1/0225 |
| 2022/0308588 | A1 * | 9/2022 | Di Federico | G05D 1/0238 |
| 2022/0377970 | A1 * | 12/2022 | Sibley | G05D 1/246 |
| 2023/0320262 | A1 * | 10/2023 | Woo | G05D 1/0246 56/10.2 A |
| 2024/0000001 | A1 * | 1/2024 | Hand | B25J 11/005 |
| 2025/0151673 | A1 * | 5/2025 | Friell | E01C 19/20 |

FOREIGN PATENT DOCUMENTS

| | | | |
|---|---|---|---|
| CN | 214593835 | U | 11/2021 |
| CN | 215302577 | U | 12/2021 |
| KR | 102356045 | B1 | 2/2022 |
| KR | 102389381 | B1 | 4/2022 |

OTHER PUBLICATIONS

Tsampikos Kounalakis et al., "A Robotic System Employing Deep Learning for Visual Recognition and Detection of Weeds in Grasslands", 2018 URL:<https://ieeexplore.ieee.org/stamp/stamp.jsp?tp=&arnumber=8577153> (Year: 2018).*

Sandler et al., MobileNetV2: Inverted Residuals and Linear Bottlenecks, arXiv:1801.04381v4 [cs.CV], Mar. 21, 2019, 14 pages.

Raja et al., Real-time robotic weed knife control system for tomato and lettuce based on geometric appearance of plant labels, Biosystems Engineering 194 (2020) 152-164.

Wild, WeedScan, a new app for identifying weeds, CSIROscope, printed from Internet https://blog.csiro.au/weedscan-app-to-identify-weeds/ on Jul. 20, 2022, 9 pages.

Oitzman, Naio Orio agricultural robot demo at World Ag Expo, printed from Internet https://mobilerobotguide.com/2022/02/15/naio-orio-agricultural-robot-launches-at-world-ag-expo/ on Jul. 20, 2022, 10 pages.

AI Weed Detector, printed from Internet https://www.immersivelimit.com/glob/ai-weed-detector on Jul. 26, 2022, 4 pages.

Gupta et al., AWS Machine Learning Blog, Building a lawn monitor and weed detection solution with AWS machine earning and IoT services, printed from Internet https://aws.amazon.com/globs/machine-learning/ . . . on Jul. 26, 2022, 18 pages.

Oto, the future of lawncase has arrived, (c) 2022, 12 pages.

Bennett, Tertill is a robot weed trimmer that's like a Roomba for your garden, CNET, Jul. 18, 2019, printed from Internet https://www.cnet.com/pictures/tertill-is-a-robot-weed-trimmer-thats-like-a-roomba-for-your-garden/3/ on Jun. 30, 2023.

* cited by examiner

AUTONOMOUS WEED TREATING DEVICE

CROSS-REFERENCE TO RELATED APPLICATIONS

The present application claims the benefit of U.S. Provisional Application No. 63/393,118 filed Jul. 28, 2022, which is incorporated herein by reference in its entirety.

BACKGROUND

The present application relates to systems and methods for performing maintenance functions on grassy terrain, such as applying a herbicide.

Grassy terrains, such as those in residential neighborhoods, require regular maintenance. Lawns are mowed, fertilized, weeded, aerated, and raked to keep them healthy. Manual weeding is time consuming and often goes undone. Herbicides are available that selectively impact broadleaf weeds over surrounding grass. However, much of the herbicide is wasted when spread indiscriminately across areas having both grass and weeds. Wasted herbicide is expensive and negatively impacts the environment.

DETAILED DESCRIPTION OF ILLUSTRATIVE EMBODIMENTS

In some embodiments, an autonomous weed treating device can treat weeds in a manner that reduces the environmental impact of herbicides.

In some embodiments, an autonomous weed treating device can treat weeds without requiring manual labor.

In some embodiments, an autonomous weed treating device may navigate about a grassy terrain (e.g., a lawn) using artificial intelligence to distinguish undesirable weeds from desirable grass and applying a herbicide to the weeds.

In some embodiments, the device may be considered a weed eliminating robot available for a retail consumer.

In some embodiments, an autonomous weed treating device may avoid the need for manually tuned variables and developer defined features associated with certain computer vision techniques.

In some embodiments, an autonomous weed treating device or robot may use deep learning to identify weeds as well as boundaries.

In some embodiments, an autonomous weed treating device or robot may use deep learning to identify weeds within a field of grass.

In some embodiments, an autonomous weed treating device may use a deep learning algorithm allowing a model to recognize a wide variety of weed types under a variety of illuminations, orientations and surrounding grass types.

Some embodiments may use deep learning to recognize grass health, different kinds of grass, and/or mushrooms.

Figure 1:
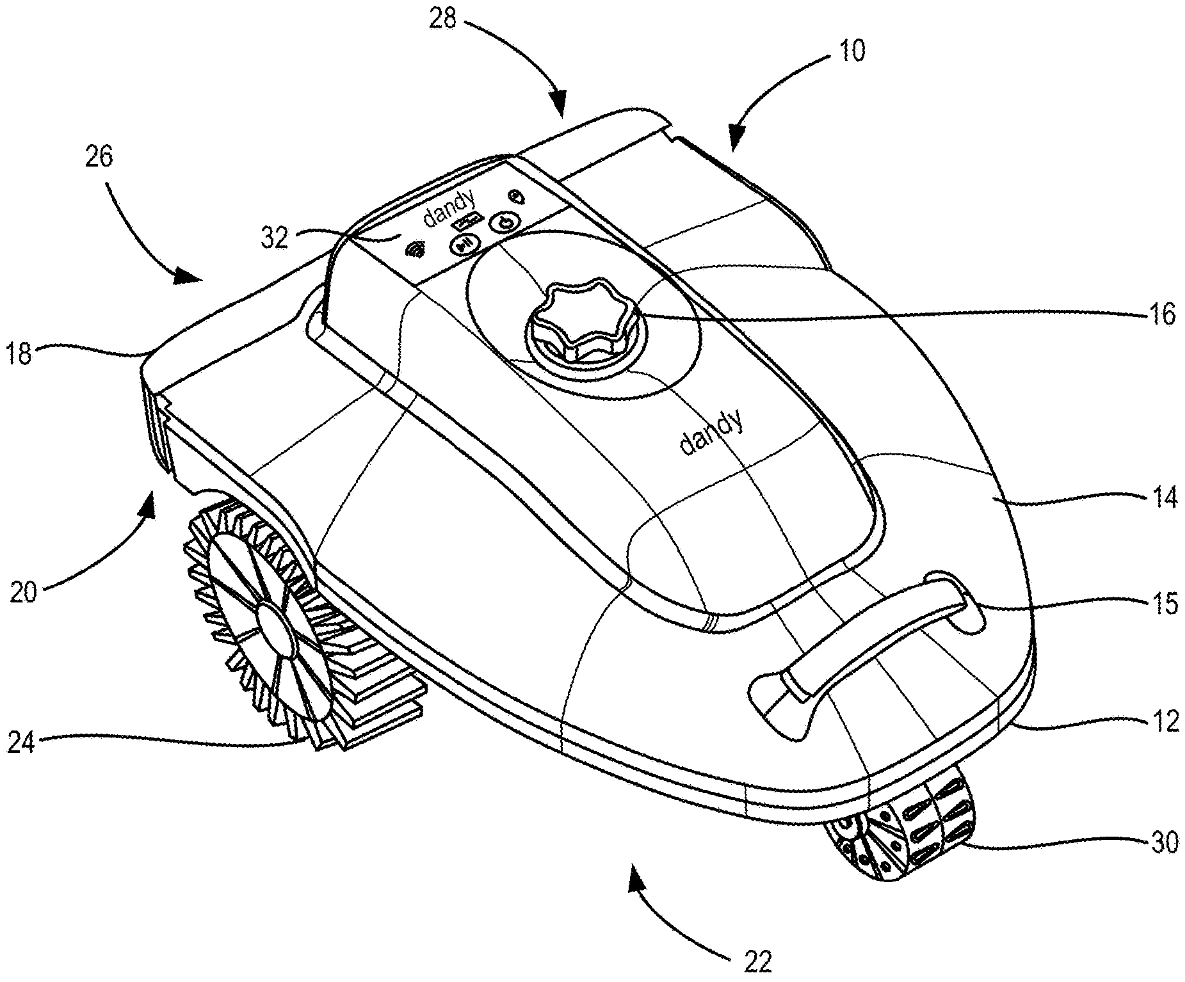
FIG. 1 is a perspective view of an autonomous weed treating device, according to an illustrative embodiment.

Referring now to FIG. 1, an autonomous weed treating device 10 for treating weeds on a grassy terrain beneath the device will be described, according to an illustrative embodiment. In some embodiments, device 10 can be sized and/or shaped in a configuration that device 10 can be lifted and/or moved to a new location by a human person. In other embodiments, device 10 may be larger and/or heavier. Device 10 comprises a body having a chassis 12 supporting one or more components as well as a housing or cover 14 disposed over chassis 12. Housing 14 (or chassis 12) may comprise an arcuate-shaped handle 15 attached thereto for ease in lifting or carrying device 10. In various embodiments, device 10 may be less than about 50 pounds, less than about 25 pounds, or less than about 12 pounds. Components described herein as coupled to one of the chassis 12 or the cover 14 may in alternate embodiments be coupled to the other of the chassis 12 or the cover 14.

Device 10 may be configured to operate under battery power autonomously to navigate a grassy terrain within a boundary, identify the presence of a weed, and treat the weed with a herbicide. Device 10 may be configured to navigate systematically in rows or at different non-180 degree angles after a boundary is reached. In other embodiments, device 10 may be configured to perform other yard maintenance operations autonomously, such as cutting grass, fertilizing grass, watering grass, collecting and/or mulching leaves, etc.

Device 10 comprises a reservoir having a fill cap 16, a bumper 18 on a front portion 20 of device 10, with the handle 15 disposed on a rear portion of device 10. Handle 15 may be disposed on a front portion or other portions of device 10, and in some embodiments at least two handles may be coupled to housing 14. One or more hand-holds may by formed as recesses in housing 14 or chassis 12 in place of, or in addition to, handle 15. While device 10 may move in a variety of directions, device 10 may move in the direction of front portion 20 during scanning for weeds and treatment of weeds. FIG. 1 also shows rotating members which are driven to move device 10 about the terrain. Rotating members may comprise wheels, continuous tracks, etc. In this embodiment, front rotating members 24 are disposed on left side 26 and right side 28 of device 10 and a rear rotating member 30 is disposed centrally. Front rotating members 24 may be each driven by a motor and rear rotating member 30 may be freely rotating (i.e., not driven) and may be a pivoting caster wheel or at least two pivoting caster wheels. Rear rotating member 30 may be configured with a tread pattern to allow friction from the ground to keep member 30 spinning in the event member 30 gets stuck by debris.

In alternative embodiments, rear rotating member or members 30 may be driven and front rotating member or members 24 may be freely rotating, or more than two wheels may be driven.

FIG. 1 also shows a user interface 32 which may be coupled to a processing circuit 34 for receiving user inputs via a user input device (e.g., buttons, softkeys, touch screen, speech recognition, etc.) and/or for displaying output data to a user (e.g., status indicators, battery level, reservoir fill/empty level, network connectivity status, etc.). User interface 32 may, in one embodiment, comprise an overlay or a printed circuit board with light-emitting diodes and a plurality of buttons encased in a plastic film and adhesive-backed.

Processing circuit 44 may also be configured to control a drive mechanism to drive rotating members 24 and/or 30 to move 12 chassis 12 along the grassy terrain.

Figure 2A:
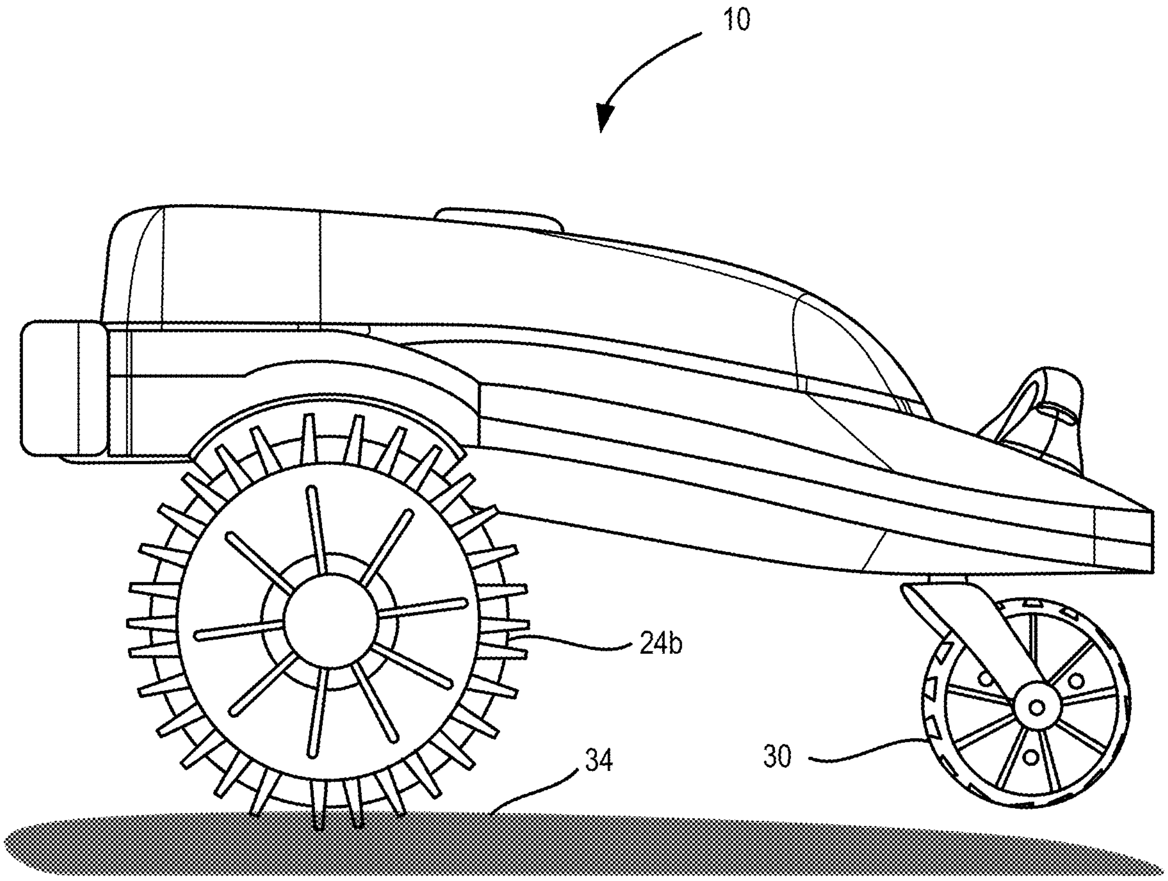
FIG. 2A is a side view of the device of FIG. 1, according to an illustrative embodiment.
Figure 2B:
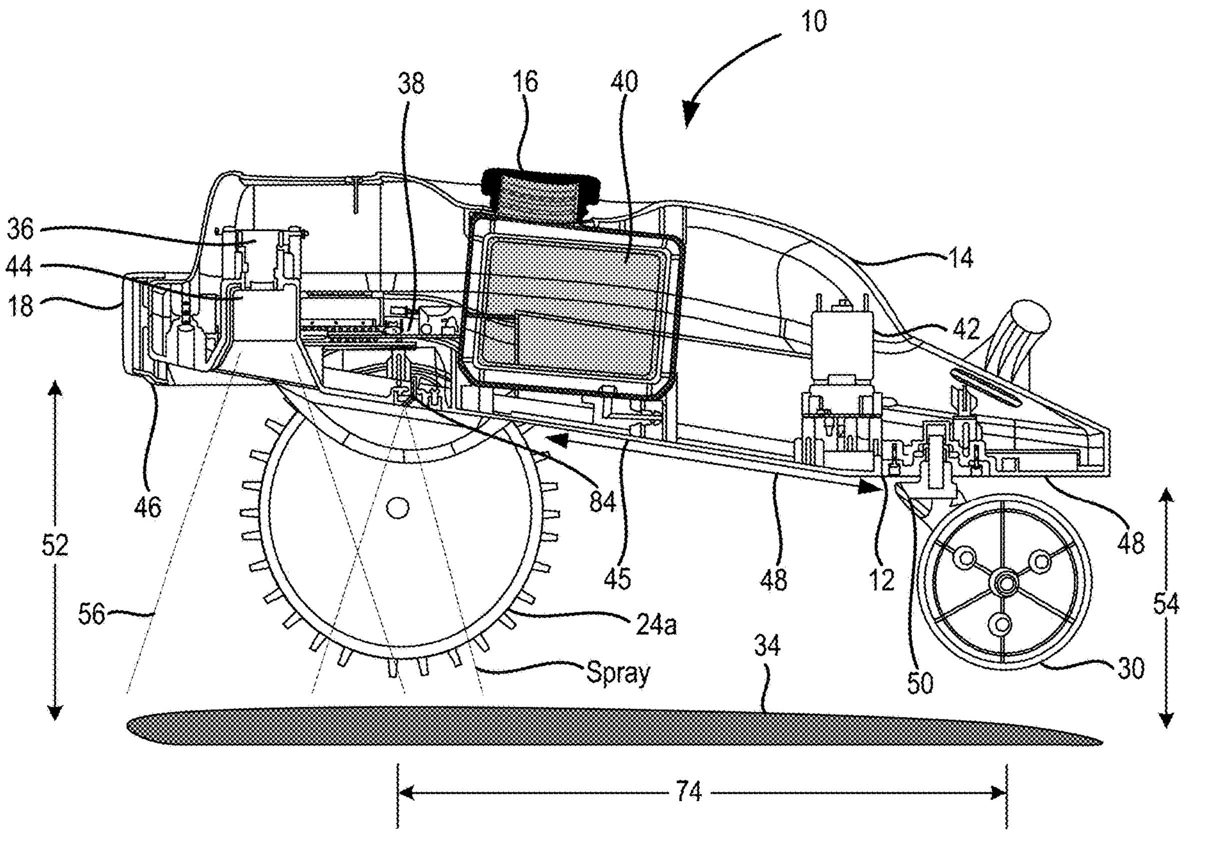
FIG. 2B is a cutaway side view of the device of FIG. 1, according to an illustrative embodiment.

FIGS. 2A and 2B show a side view and a side cutaway view of autonomous weed treating device 10 for treating weeds on grassy terrain 34 beneath the device. FIGS. 1 and 2A illustrates curved surfaces of chassis 12 and housing 14 that help device 10 to avoid getting caught on obstacles such as bushes, especially while turning. In this embodiment chassis 12 is configured to support a camera 36, a dispenser 38, a reservoir 40, a pump 42, a processing circuit 44, and/or other components. Chassis 12 has a bottom surface 45 extending from a front edge 46 to a rear edge 48. At least a portion 48 of bottom surface 45 may be provided at an angle or rise relative to a horizontal plane on which device 10 is disposed. The angle or rise may be at least about 3 degrees, at least about 6 degrees, 9 degrees, less than 45 degrees, less than 30 degrees, or other degrees of a rise. An angled chassis and/or large front wheels may provide suitable clearance for obstacles that may be found in a typical yard.

Front rotating members 24*a*, 24*b* may be coupled to chassis 12 by motors and/or drive mechanisms. Rear rotating member 30 may be coupled to chassis 12 by a pivot mechanism 50. According to another aspect, chassis 12 and rotating members 24*a*, 24*b* and 30 are configured to provide front portion 20 of the chassis at a first distance 52 from grassy terrain 34 which is higher than a second distance 54 from grassy terrain 34 of rear portion 22 of chassis 12, for example when device 10 is disposed on terrain which is substantially level or horizontal. First distance 52 may be at least about two inches, at least about three inches, and/or less than about six inches, less than about ten inches, or about 4.8 inches in different embodiments. Second distance 54 may be at least about one inch, less than about five inches, less than about eight inches, or other lengths in different embodiments.

According to another aspect, chassis 12 may have a bottom surface 12 having a plane which is provided non-parallel grassy terrain 34, at least over a portion 48 of bottom surface 12.

According to another aspect, the one or more front rotating members 24*a*, 24*b* may be larger than rear rotating member 30, such as having a diameter at least 25 percent larger, 50 percent larger, etc. than rear rotating member 30.

FIG. 2B also illustrates a field of view 56 of camera 36 according to an exemplary embodiment. The disposition of front portion 20 of chassis 12 higher than rear portion 22 of chassis 12 allows for a wider field of view of camera 36 in some embodiments. In other embodiments, a lens or different camera may be used to expand the field of view of the camera.

FIG. 2B illustrates camera 36 camera coupled to chassis 12 and/or housing 14. Camera 36 is configured to acquire images of grassy terrain 34 and transmit them to processing circuit 44. Processing circuit 44 may be configured to process the images to identify a weed. Processing circuit 44 may then be configured to control pump 42 to dispense a herbicide or other substance from reservoir 40 to treat the weed. Processing circuit 44 may be configured to activate pump for a predetermined period of time (e.g., at least one second, at least two seconds, less than one second, etc.) to apply a predetermined amount of substance to the weed. The substance disposed in reservoir 40 may be an organic substance, or a non-organic substance. Camera 36 may be disposed on front portion 20 of the chassis and dispenser 38 may be disposed rearward of camera 36 to allow for processing time to identify a weed and trigger a herbicide application as device 10 moves forward along the grassy terrain. Camera 36 may be directed normal to the plane of the terrain or at an angle of less than 90 degrees relative to the plane of the terrain. Images may be acquired from underneath the device 12 or from outside of the device, in different embodiments. A sprayer may be used, which may be disposed at any of a number of different locations on chassis 12. In one embodiment, sprayer 38 may be disposed close enough to camera 36 so that the time between weed detection and spraying is minimized, for example, less than about 12 inches, less than about six inches, or other distances. The sprayer may be disposed with enough vertical clearance from the ground for a suitably wide cone of spray.

Figure 3:
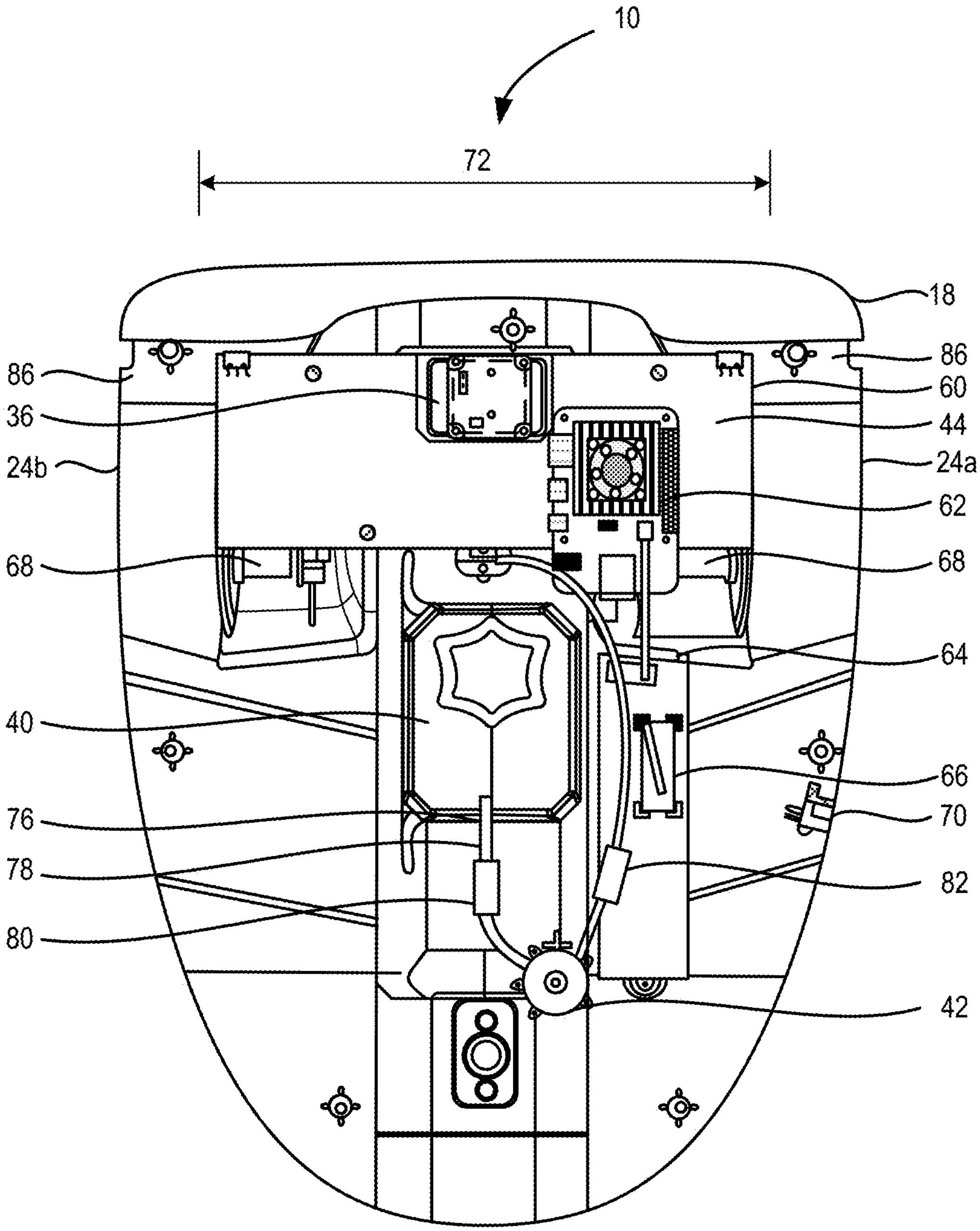
FIG. 3 is a cutaway top view of the device of FIG. 1, according to an illustrative embodiment.

Referring now to FIG. 3, illustrative components supported by the chassis will be described. A processing circuit 44 is provided which may comprise one or more analog and/or digital electronic components configured, arranged and/or programmed to perform one or more of the functions described herein. Processing circuit 44 may be disposed in or on chassis 12 and/or housing 14. Processing circuit 44 may comprise discrete circuit elements and/or programmed integrated circuits, such as one or more microprocessors, microcontrollers, analog-to-digital converters, application-specific integrated circuits (ASICs), programmable logic, printed circuit boards, and/or other circuit components. Processing circuit 44 may further be coupled to a network interface circuit, such as a wireless circuit configured to provide communications over one or more networks. The network interface circuit may comprise digital and/or analog circuit components configured to perform network communications functions. The networks may comprise one or more of a wide variety of networks, such as wired or wireless networks, wide-area, local-area or personal-area networks, proprietary or standards-based networks, etc. The networks may comprise networks such as networks operated according to Bluetooth protocols, IEEE 802.11x protocols, cellular (TDMA, CDMA, GSM) networks, or other network protocols. The network interface circuit may be configured for communication on one or more of these networks and may be implemented in one or more different sub-circuits, such as network communication cards, internal or external communication modules, etc.

A location circuit may be provided for performing navigation functions, such as receiving signals from global positioning system satellites, cellular network towers, Wi-Fi routers, or other devices. The location circuit may be configured to determine a location of the autonomous device and/or provide the location to processing circuit 44. Processing circuit 44 and/or the location circuit may be configured to navigate the autonomous device across a grassy terrain based on a program stored in a memory circuit.

The location circuit may comprise one or more of a Global Positions System receiver and processor, odometry devices (e.g., wheel motor encoders), an inertial measurement unit (IMU), a magnetometer, or other sensors. The inertial measurement unit may be configured to measure and report the device's force, angular rate, and/or orientation and may use one or more of accelerometers, gyroscopes, and magnetometers. The location circuit may further use a filter such as an Extended Kalman Filter (EKF) to predict location, orientation, and/or movement information on a global coordinate frame and/or locally.

The memory circuit may be in communication with processing circuit 44 and/or may be a part of processing circuit 44. The memory circuit may comprise a tangible computer readable medium comprising any type of computer readable storage. The term tangible computer readable medium excludes propagating signals. The memory circuit may store algorithms to implement processes described herein using coded instructions (e.g., computer readable instructions) stored on a non-transitory computer readable medium such as a hard disk drive, a flash memory, a read-only memory, a cache, a random-access memory and/or any other storage media in which information is stored for any duration (e.g., for extended time periods, permanently, brief instances, for temporarily buffering, and/or for caching of the information). The memory circuit may include any desired type of volatile and/or non-volatile memory such as, for example, static random access memory (SRAM), dynamic random access memory (DRAM), flash memory, read-only memory (ROM), etc.

In an exemplary embodiment, processing circuit 44 comprises a printed circuit board and assembly (PCBA) 60 and a microprocessor 62 or multiple microprocessors which may be configured to execute machine learning algorithms as well as the other functions described herein. A location circuit comprising a GPS receiver may also be disposed on the PCBA 60. A GPS antenna 66 may be coupled to (e.g., adhered) a pocket on a battery compartment to provide clearance from other electronics and height for good reception of GPS signals. In one embodiment, battery compartment may comprise a metal flat surface (or plastic flat surface supporting a sheet of metal) to act as a ground plane. Battery compartment 64 comprises one or more batteries configured to power processing circuit 44, drive motors 68, camera 36, pump 42, and/or other components of device 10. Camera 36 *m* provide a top-down view of grassy terrain beneath device 10 and weeds therein. The battery may be rechargeable using charging port 70, which may be coupled to an external power source, to a solar charging unit, or to other power sources.

First and second rotating members 24*a*, 24*ba* are separated by a wheelbase 72 of at least about 10 inches, at least about 15 inches, less than about 24 inches, or other lengths. A second wheelbase 74 may be defined between forward rotating members 24*a*, 24*b* and rearward rotating member 30. Wheelbases 72 and/or 74 may be wide/long enough to provide stability on hills and bumps.

FIG. 3 illustrates components of a dispenser for dispensing a substance. The dispenser may be a spray system, a drip system or a system for distributing a solid substance. Reservoir or tank 40 may hold the substance to be dispensed. Reservoir 40 may have a volume of less than about a gallon, less than about a quart, or other volumes in different embodiments. Reservoir 40 may be inaccessible for an end user to remove or may be removable and replaceable with a reservoir of different size (larger or smaller) or a disposable reservoir being prefilled with substance. Reservoir 40 may comprise a fitting 76 for coupling reservoir 40 to a tubing system 78. Tubing system 78 may comprise a filter 80 disposed therein for catching any particulates that may damage the pump. The substance may then pass through a gear pump 42 controlled by the processing circuit. Alternative pumps are contemplated, such as a bladder pump, peristaltic pump, etc. The substance may then pass through a portion of tubing system which is routed up along the top of the battery compartment 64 to reduce head pressure to prevent leaks, and pass through a check valve 82 which may keep the substance at a nozzle 84 (FIG. 2B) to allow instantaneous start/stop of the spray. The substance then passes through nozzle 84 and is dispensed to the terrain beneath device 10. Nozzle may by any of a number of types of nozzles, such as a refraction nozzle in which a fluid splashes against a plate and is fanned onto the ground, an axial nozzle in which the fluid is swirled and sprayed in a cone, or other nozzle types.

Bumper 18 may be coupled to one or more bumper switches 86 (e.g., touch sensors) for detecting contact of bumper 18 with an object, such as a fence, tree, brick, or building. Bumper 18 may be coupled to device 10 with couplings or fasteners, such as snap fits to constrain bumper 18 horizontally into chassis 12. Guides may be provided constrain bumper 18, allowing bumper 18 to slide forward and back, with springs around these guides. The guides may be configured to activate bumper switches 86, which may comprise limit switches mounted to and/or in communication with PCBA 60, when either side of bumper 18 is compressed. If most of the contact force is on the left side, for example, only the left limit switch will be compressed. If contact force is generally in the center of bumper 18, both switches will be compressed. Processing circuit 44 may be configured to receive signals from the switches and cause device 10 to react accordingly, differently depending on which of left switch, right switch, or both are compressed.

Figure 4:
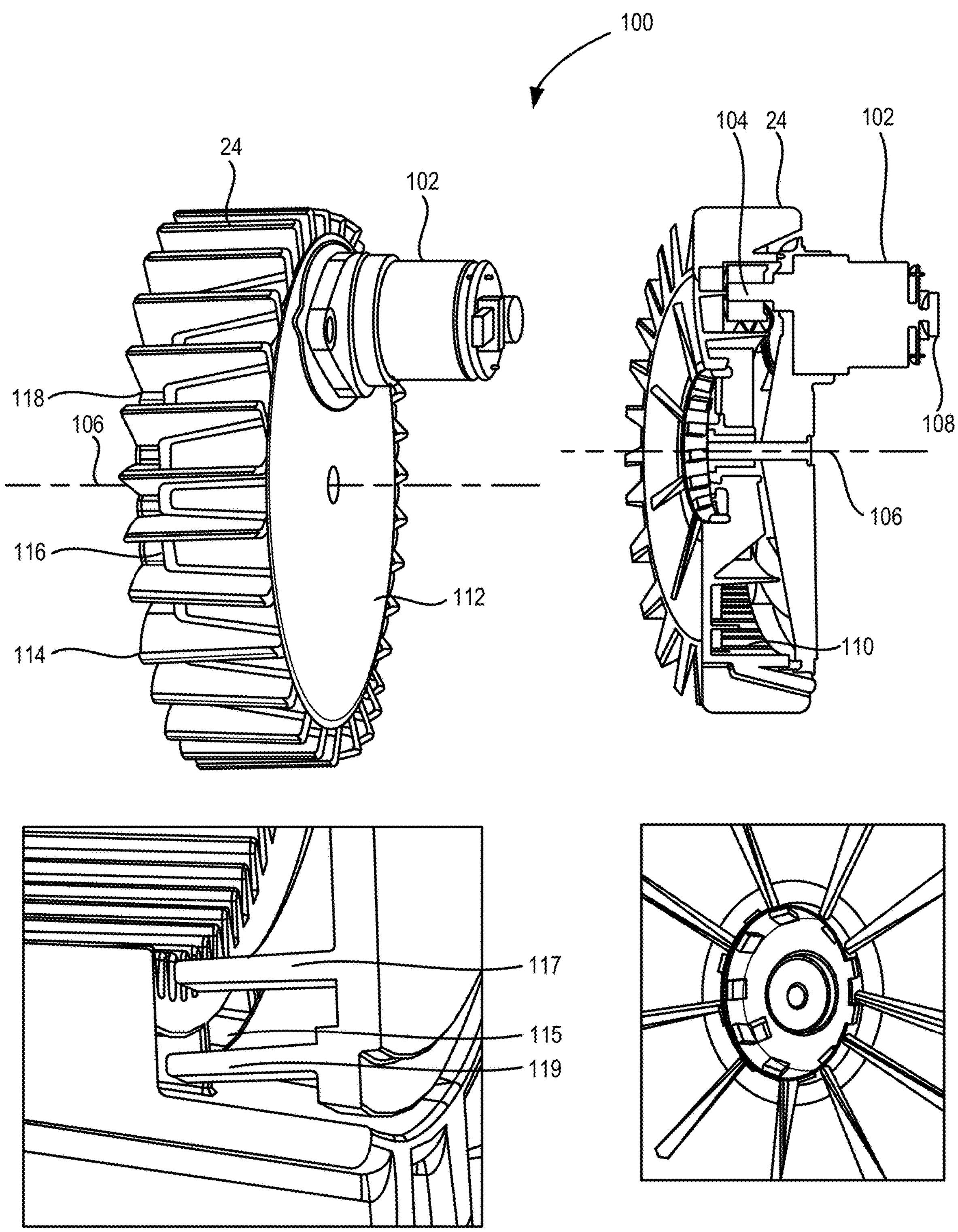
FIG. 4 is a perspective view, a cutaway view and a partial view of a wheel drive mechanism, according to an illustrative embodiment.

Referring now to FIG. 4, a wheel drive mechanism 100 will be described for use with any of the embodiments described herein. A motor 102 is shown in perspective view and a cutaway view. Motor 102 may comprise a DC motor, stepper motor, brushless motor, or other motor type. In this embodiment, motor 102 has a drive shaft 104 having an axis 108 which is eccentric to a center 106 of rotating member 24. Motor 102 may be supported by chassis 12 and coupled to wheel 24 at a top portion of rotating member 24. A chassis mount further comprises a stationary cylindrical portion 112 around which the rotating member rotates. A gap between the chassis mount and wheel can be made minimal to prevent entry of debris. A pinion gear 104 may be coupled or fixed to (e.g., pressed on) drive shaft 104 and in rotational relationship with an internal ring gear 110 of rotating member 24. In this manner, processing circuit 44 is configured to control motor 102 to drive shaft 104 and pinion gear 104 to drive wheel 24 by way of internal ring gear 110. Other drive arrangements are contemplated. The disposition of motor 102 in a top portion of rotating member 24 allows for a portion of chassis 12 to be at a greater distance from the ground than if motor was disposed more centrally near or on axis 106. The greater distance or vertical offset may provide one or more advantages in different embodiments, such as providing high torque, allowing the motor to be housed within or recessed within chassis 12, sitting near a top of the wheel, and also for good obstacle clearance, more space in a frame of the downward-facing camera, and a larger distance for the camera focus and spray cone. The vertical offset may further be higher at a front portion of chassis 12 than at a rear portion of chassis 12. The motor may be disposed at least partially above a bottom surface of the chassis.

Also shown in FIG. 4 is a labyrinth seal 115 formed by a secondary rib 117 of the chassis mount, which provides additional resistance to debris entering the gear chamber. A further rib may extend from the wheel outward between rib 117 and outer ring 119 for additional debris resistance.

In some embodiments, the camera may be disposed between at least about 3 inches and/or less than about ten inches from the grassy terrain. In some embodiments, the dispenser (e.g., sprayer) may be disposed at least about 3 inches and less than about ten inches from the grassy terrain.

In a further example, the drive shaft 104 of motor 102 may be eccentric to a housing of motor 102 to provide additional vertical displacement for front distance 52 (FIG. 2B).

FIG. 4 also shows an advantageous tread configuration on rotating member 24 which has a plurality of treads 114 each separated by a recessed portion 116 having an angled surface which reduces in radius relative to axis 106 as it extends along a width of the tread. A second portion 118 of recessed portion 116 has a substantially constant radius as it extends along a width of the tread.

In some embodiments, the device may be configured to navigate itself within an area or region within a boundary or geofence or virtual border. The boundary can be programmed into memory of device 10 in any of a number of ways. In one example, a smartphone or other handheld computing device may operate an application downloaded from an application store as a companion app for device 10. The handheld computing device may communicate wirelessly with a network interface circuit of device 10. The application may display a map of a user's location on the screen (e.g., a satellite image of the area) and receive from the user a tracing or drawing of a boundary or perimeter to follow using drawing tools. The application may use image processing on the satellite image to propose a boundary and then allow the user to modify the boundary to simplify the task for the user. GPS points or coordinates for the boundary can be transmitted from the handheld computing device to the device 10. Device 10 may be configured to apply preprocessing to the data points to generate a workable geofence. With a geofence established and stored in memory, the processing circuit of device 10 may be configured to control the device to navigate within the boundary defined by the boundary coordinates using real time location data from the location circuit (e.g., from a sensor fusion of the different location devices). If device 10 crosses the geofence, the processing circuit may be configured to find a closest location on the geofence and use point-to-point navigation to return the device to that point. The device 10 may then proceed navigation on the inside of the geofence.

In some embodiments, the processing circuit may be configured to use the camera to detect a lack of movement while the wheel motors are moving. This condition may indicate device 10 is stuck. Alternatively, other sensors such as GPS, magnetometer, IMU, etc. may be used together or independently to determine a stuck condition. An alert can be generated by the processing circuit for display on the user interface and/or for transmission to an application on a smartphone to alert the user to the stuck condition.

In some embodiments, the smartphone app may further be configured to push firmware updates over the air to device 10, receive logs on use and errors, etc.

In some embodiments, an autonomous weed treating device may be configured to acquire images of a grassy terrain, process the images to identify a weed or distinguish among a weed, grass and an operating boundary, and control the dispenser to dispense a substance on the weed. The processing circuit of the device may be configured to use machine learning, for example deep learning to process the images. Deep learning may comprise using a neural network algorithm that is many layers deep. First layers may learn simple gradients and lines and as the layers get deeper, they recognize more complex features of an image. A final layer is then able to distinguish if there is a weed (or another feature) in the image. Deep learning may comprise using at least five layers, at least fifteen layers, at least thirty layers, etc. In one embodiment, the neural network may be 53 layers deep.

In some embodiments, a computing system may be configured to use deep learning via a convolutional neural network. In one example, the computing system may be configured to use one or more steps of the MobileNetV2 architecture described in M. Sandler et al., "MobileNetV2: Inverted Residuals and Linear Bottlenecks," arXiv: 1801.04381 [cs.CV], 21 Mar. 2019. See also The IEEE Conference on Computer Vision and Pattern Recognition (CVPR), 2018, pp. 4510-4520. The computing system (e.g., laptop, cloud server, desktop computer, etc.) may be configured to train a model to be able to classify images as belonging to one or more classes, such as: grass, weeds, boundary, etc. A model may be a program that has been trained on a set of data to recognize patterns. In some embodiments, representative images are classified into one of three categories: grass, weeds, or boundary. In various embodiments, three categories may be used, more than three categories (mushrooms, healthy grass, brown grass, unhealthy grass, specific types of weeds, etc.), less than three categories, etc. The computing system may be configured to label a set of images and then to use supervised learning to automatically tune a set of weights. The processing circuit of the autonomous device may be configured to use the weights paired with a deep learning model architecture to make predictions about what classes an image belongs to as the images are obtained from the camera.

In some embodiments, the processing circuit may be configured to use one or more artificial neural networks with representation learning. Learning may be supervised, semi supervised or unsupervised. In some embodiments, one or more open-source algorithms may be used. In some embodiments, a plurality of machine learning algorithms may be used, for example by concatenation, interweaving, etc.

In some embodiments, images may be processed by generating a plurality of layers to progressively extract higher-level features in the images.

In some embodiments, the processing circuit is configured to compare grass to weeds (e.g., dandelions, crabgrass, Creeping Charlie, clover, etc.) in a grassy terrain. An image can be classified as containing grass when the processing circuit identifies the image as corresponding to any type of grasses, whether cool season (e.g., Kentucky Bluegrass, fescue, rye) or warm-season grasses (Centipede grass, Bermuda grass, Zoysia grass, St. Augustine Grass, etc.).

One class that may be identified may be a boundary between a grassy terrain and a neighboring region, such as dirt, concrete, a garden, etc.

After the processing circuit determines the presence of one or more classes, such as a weed or a boundary, the processing circuit may be configured to control one or more actuators in response. For example, in response to identifying a boundary, the processing circuit may be configured to drive rotating members in a reverse direction for a predetermined period of time or until the camera images show a return to a grassy terrain The processing circuit may then be configured to drive the rotating members to turn a direction of travel of the chassis to an angle relative to the direction of travel when the device traveled in the reverse direction. In some embodiments, upon detecting a boundary, the processing circuit may be configured to change the direction of travel by an angle of less than 180 degrees (or in some cases 180 degrees). In some embodiments, the angle may be pseudorandomly selected by the processing circuit. In other embodiments, the angle may be deliberately selected.

Figure 5:
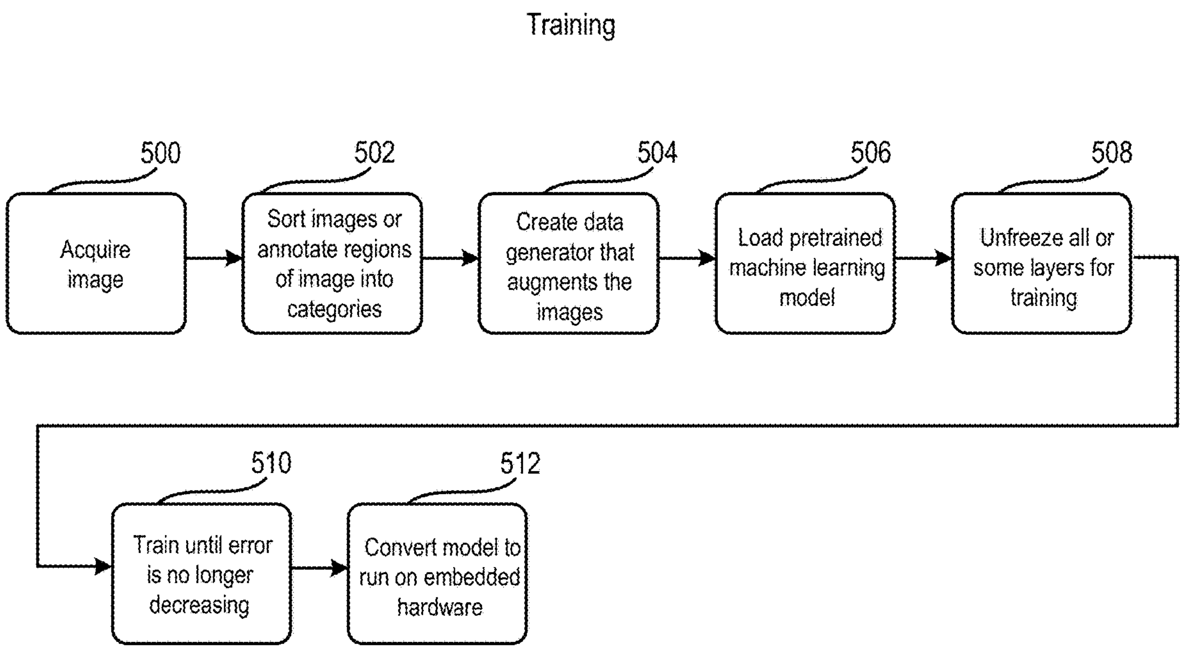
FIG. 5 is a flowchart of offline training using deep learning, according to an illustrative embodiment.

Referring now to FIG. 5, an algorithm for training a model using deep learning will be described, according to an exemplary embodiment. At a block 500, a computing system may be configured to receive a plurality of images, the images representing various foliage and other features such as grassy terrain, grassy terrain comprising one or more weeds, a boundary between an operating zone of a robot (e.g., grassy area) and non-operating zone (e.g., dirt, mulch, vegetable garden, etc.). The images are stored in a memory accessible by the computing system. At a block 502, a person may sort the images into various categories, such as grass, weed, boundary, etc., and tag or label or highlight the images or a portion thereof for further processing in a supervised learning embodiment. In some embodiments, the computing system may be configured to automatically sort images to assist in the sorting process. In some embodiments, certain images may be excluded from the training set, such as images which are blurry or images in which it is difficult to determine if the image is all grass or contains very small weed. At block 504, the computing system may be configured to create a data generator that augments the images by one or more of applying random flips, cropping images, contrasting the images, adding Gaussian noise (e.g., using mean (convolution) filtering, median filtering, Gaussian smoothing, etc.), applying affine transformations, etc. The data generator may be created using an open-source library, such as Keras. A Keras data generator may be used to handle loading the images from a memory or disk and applying the augmentations to the images. At block 506, the computing system is configured to load a pretrained model, such as one using the Mobile NetV2 algorithm. The pretrained model may be provided by Keras and may be a result of training the Mobile NetV2 architecture on a publicly available ImageNet dataset containing millions of images. The pretrained model provides classification for 1000 different classes. Since this model has trained on many different images, the lower layers have become adept in recognizing basic gradients and shapes. These lower layers may remain intact as the computing system retrains the upper layers for our application. At a block 508, one or more top layers of the many-layer model are unfrozen to allow training. At a block 510, the computing system is configured to train the model using the images from steps 500 through 504. Training of the model can use a deep learning architecture (e.g., hierarchical learning, deep neural learning, deep structured learning, etc.). The deep learning architecture may comprise a deep neural network, a deep belief network, a recurrent neural network and/or a convolutional network.

In some embodiments, the computing system is configured to build a model based on sample data (e.g., training data, a training corpus, etc.) comprising the images which are acquired and sorted. When programmed into an autonomous weed treating device, the model may be used by processing circuit 44 to make predictions or decisions about the content of a newly acquired image. The computing system may be configured to use one or more of a convolutional neural network, a Bayesian network, a nearest neighbor algorithm, reinforcement learning, or other algorithms to teach the model.

The training can be done iteratively. The computing system may be configured at each iteration to calculate the error and the iterations may continue until the error is no longer decreasing, indicating the model has completed the training with the given inputs. In some embodiments, additional images can be added and the method can continue iterations with the additional images for improved training of the model. In some embodiments, other results may be used as an indication to stop the training, such as an error of sufficiently small size, an error that is decreasing below a predetermined rate, or other results. At a block 512, the computing system may be configured to quantize and compile the model to run on embedded hardware in the autonomous device described herein.

In some embodiments, an autonomous weed treating device may be configured to use a machine learning model generated using one or more of the steps described above with reference to FIG. 5.

In some embodiments, a computing system may comprise a machine-learned deep learning neural network configured to receive images from a camera and to process the images to classify the images as belonging to a weed class, a grass class, and/or a boundary class.

The steps in FIG. 5 may be implemented using alternatives to those described or with additional steps in between. For example, image preprocessing may take place before block 504 in some embodiments. Block 506 may use other architectures besides MobileNetV2. Block 508 could unfreeze all layers of the deep learning model, or more or fewer layers of the deep learning model.

In some embodiments, unsupervised learning may be used by autonomous device 10 which would allow device 10 to continue learning while in operation. In another embodiment, device 10 may be configured to detect a type of grass being seen in the images and select one of a plurality of models or weights from a memory to correspond to the type of grass detected. In another alternative, images may be collected by a robot while in use treating weeds and a user may be allowed to update the model to make a customized model using images from the user's yard.

Figure 6:
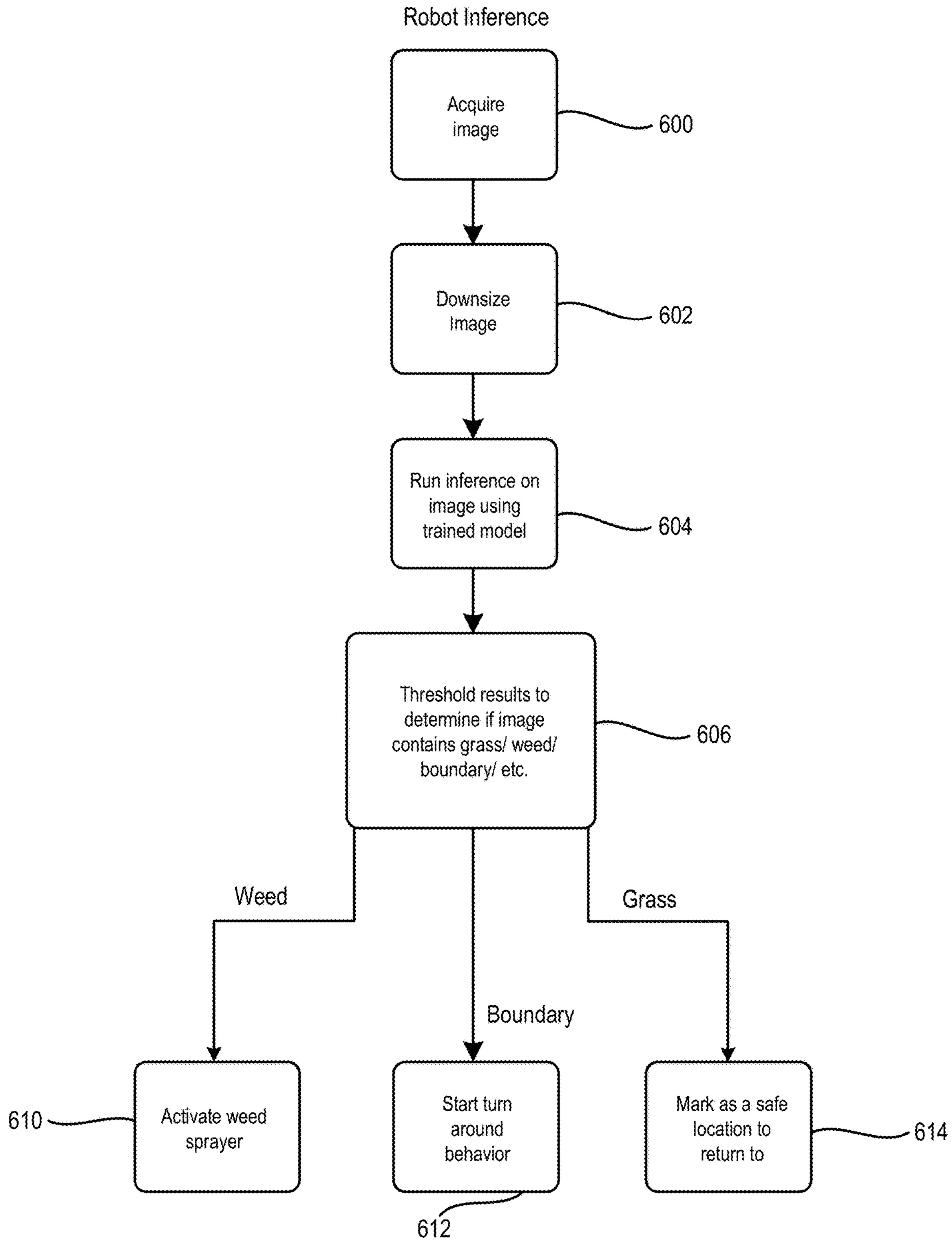
FIG. 6 is a flowchart of robot inference using a model trained with deep learning, according to an illustrative embodiment.

Referring now to FIG. 6, a method of using a trained model on an autonomous weed treating device will be described. At a block 600, the autonomous weed treating device 10 is configured to acquire an image using camera 36 as the device is traversing a grassy terrain within an operating region defined by a boundary or perimeter. At a block 602, the image may be downsized for further processing. For example, camera 36 may be an ELP-USBFHD01M-L26 120 frame per second PCB USB2.0 webcam board 2 Megapixel 1080P CMOS camera module with 3.6 mm lens, available from Shenzhen Ailipu Technology Co., Ltd, Shenzhen, China. Camera 36 may be configured to acquire images at 100 frames per second or greater with an image size of at least about 2 megapixels. At block 602, the processing circuit 44 may be configured to downsize the image to about 224 by 224 megapixels, or by at least 50%, at least 75%, or at least 90% in different embodiments. At a block 604, processing circuit 44 is configured to run an inference algorithm on the downsized image using a trained model, such as a model trained using a deep learning algorithm, such as the illustrative model described in FIG. 5. At a block 606, processing circuit 44 may be configured to analyze threshold results to determine if the acquired image contains grass, weeds, boundary, etc. If processing circuit 44 identifies a weed, the device may be configured to activate a dispenser or weed sprayer at block 610. If processing circuit 44 identifies a boundary, processing circuit 44 may be configured at block 612 to operate a turn-around algorithm to drive the device 10 in a different direction away from the boundary. If processing circuit 44 identifies the image as a grass area, processing circuit 44 may store location data for the location of the image identifying it as a safe location to return to when a grassy area is desired. Other actions may be performed along with or in place of the actions shown in block 610, 612 and 614. For example, processing circuit 44 may save the location of the identified feature or class to a map file for presentation to a user on a display screen of the handheld device.

In some embodiments, upon detecting a boundary, the processing circuit may be configured to store coordinates for the boundary point or segment in a memory. The boundary coordinates may be used to create, edit, or update a boundary being used by the device as a limit to the region of travel of the device.

In some embodiments, upon detecting a weed, the processing circuit may be configured to store coordinates for the location of the weed in a memory. The coordinates may be used to generate a map image showing locations of weeds that were treated for presentation to a user on a display screen, for example, on a user's smartphone or other handheld computing device.

In some embodiments, a system or method may comprise training a machine learning prediction model using deep learning based on images in predefined classes comprising a grass image, a weed image and a boundary image. The system or method may further comprise applying the machine learning prediction model to predict a classification of a new image as comprising grass, a weed and/or a boundary.

In some embodiments, a computer-implemented method of training a neural network for weed detection may comprise collecting a set of digital images from a database, creating a first training set of images by sorting the images into a category comprising a weed, creating a second training set of images by sorting the images into a category comprising a grassy area, and training the neural network using deep learning and using the first and second sorted images to create a trained model. In some embodiments, an autonomous weed treating device is configured to use the trained model to classify images obtained by a camera of the autonomous weed treating device as it traverses a grassy terrain.

In some embodiments, a system or method may comprise processing acquired digital images of a grassy terrain with a deep learning neural network configured to detect a presence of a weed amongst the acquired digital images and to trigger a dispenser in response to the detection of the weed. The system or method may further comprise wherein the deep learning neural network is trained using a plurality of training image files which have been classified.

In one embodiment, an autonomous yard maintenance device for maintaining a grassy terrain beneath the device comprises a body comprising a chassis, at least one front rotating member coupled to the chassis and at least one rear rotating member coupled to the chassis, wherein at least one of the front and rear rotating members is driven by a motor having a drive shaft disposed eccentric to a center of the wheel. The device further comprises an actuator configured to perform a yard maintenance operation on the grassy terrain and a processing circuit. The processing circuit may be configured to drive the rotating members to move the chassis along the grassy terrain and control the actuator to perform the yard maintenance operation on the grassy terrain.

In some embodiments, the yard maintenance operation is selected from the group comprising dispensing a herbicide, cutting grass, fertilizing grass and watering grass.

In some embodiments the chassis may have a bottom surface having a front portion opposite a rear portion. In some embodiments, the chassis and rotating members may be configured to provide the front portion of the chassis at a first distance to the grassy terrain higher than a second distance to the grassy terrain of the rear portion of the chassis.

In some embodiments, the device may comprise a camera coupled to the body and configured to acquire images of the grassy terrain, the processing circuit configured to process the images to identify a weed, wherein the actuator comprises a herbicide sprayer.

In some embodiments, the camera may be disposed between about two inches and about ten inches from the grassy terrain.

In some embodiments, the sprayer may be disposed between about two inches and about ten inches from the grassy terrain.

In some embodiments, the drive shaft of the motor may be eccentric to the motor housing.

In some embodiments, a pinion gear may be coupled to the drive shaft and configured to drive an internal ring gear to drive the rotating member.

In some embodiments, the chassis may have a bottom surface, wherein the motor is disposed at least partially above the bottom surface of the chassis.

In some embodiments, the motor may be disposed near a top of the wheel.

In some embodiments, either of the front and rear rotating members may comprise a pivoting caster.

In some embodiments, the front rotating member may have a diameter at least fifty percent larger than the rear rotating member.

In some embodiments, the camera may be disposed on the front portion of the chassis and the dispenser may be disposed rearward of the camera.

In some embodiments, the device may be configured to be lifted and moved to a new location by a human person.

In some embodiments, a handle may be disposed on the body configured to be used by the human person to lift and move the device.

In some embodiments, a bumper may be disposed at a front portion of the chassis and at least one bumper switch may be configured to detect contact of the bumper with an object, the processing circuit configured to receive a signal from the bumper switch indicating contact with the object.

In some embodiments, a processing circuit of the device may be coupled to or comprise an inductive sensor configured to detect signals transmitted by a wire (e.g., low voltage wire) set up for robotic lawnmowers, wireless dog fences, etc. The processing circuit may be configured to use the detected signal in its navigation calculations, for example, to identify a border of an area to be treated.

Certain embodiments described herein can omit one or more of the method steps and/or perform the steps in a different order than the order listed. For example, some steps need not be performed in certain embodiments. As a further example, certain steps can be performed in a different temporal order, including simultaneously, than listed above.

While the embodiments have been described with reference to certain details, it will be understood by those skilled in the art that various changes can be made and equivalents can be substituted without departing from the scope described herein. In addition, many modifications can be made to adapt a particular situation or material to the teachings without departing from its scope. Therefore, it is intended that the teachings herein not be limited to the particular embodiments disclosed, but rather include additional embodiments falling within the scope of the appended claims.

What is claimed is:

1. An autonomous weed treating device for treating weeds on grassy terrain beneath the autonomous weed treating device, comprising:

a body comprising a chassis;

a plurality of rotating members driven to move the chassis along the grassy terrain;

a camera coupled to the body and configured to acquire images of the grassy terrain;

a dispenser configured to dispense a herbicide; and a processing circuit configured to:

drive the rotating members to move the chassis along the grassy terrain;

process the images using a model trained with deep learning to identify a weed;

control the dispenser to dispense the herbicide on the weed, wherein the autonomous weed treating device is configured to be lifted and moved to a new location by a human person.

2. The autonomous weed treating device of claim 1, wherein the processing circuit is further configured to identify a boundary between the grassy terrain and a neighboring region.

3. The autonomous weed treating device of claim 2, wherein the processing circuit is further configured to drive rotating members in a reverse direction in response to identifying the boundary.

4. The autonomous weed treating device of claim 3, wherein the processing circuit is further configured to identify the grassy terrain after identifying the boundary and, in response to identifying the grassy terrain, to drive the rotating members to turn a direction of travel of the chassis.

5. The autonomous weed treating device of claim 1, further comprising a location circuit configured to provide geographic location data for the autonomous weed treating device, wherein the processing circuit is configured to navigate the autonomous weed treating device using the geographic location data.

6. The autonomous weed treating device of claim 5, wherein the location circuit comprises a global positioning circuit, wheel motor encoders and at least one of an inertial measurement unit and a magnetometer to provide the geographic location.

7. The autonomous weed treating device of claim 1, wherein, upon detecting a boundary, the processing circuit is configured to change the direction of travel by an angle of less than 180 degrees.

8. The autonomous weed treating device of claim 7, wherein the angle is pseudorandomly selected.

9. The autonomous weed treating device of claim 1, further comprising a network interface circuit configured to communicate with a handheld computing device, wherein the processing circuit is configured to receive boundary coordinates from the handheld computing device and to control the autonomous weed treating device to operate within a boundary defined by the boundary coordinates.

10. The autonomous weed treating device of claim 9, further comprising the handheld computing device, wherein the handheld computing device is programmed to display a map and define the boundary coordinates based on receiving user input tracing the boundary on the map.

11. The autonomous weed treating device of claim 1, wherein the herbicide is a liquid herbicide.

12. An autonomous weed treating device for treating weeds on grassy terrain beneath the autonomous weed treating device, comprising:

a body comprising a chassis;

a plurality of rotating members driven to move the chassis along the grassy terrain;

a camera coupled to the body and configured to acquire images of the grassy terrain;

a dispenser configured to dispense a herbicide; and a processing circuit configured to:

drive the rotating members to move the chassis along the grassy terrain;

process the images to identify a weed, wherein the processing comprises using a model trained by a neural network algorithm having first layers learning gradients and lines, second deeper layers and a final layer to recognize a variety of weed types;

control the dispenser to dispense the herbicide on the identified weed, wherein the autonomous weed treating device is configured to be lifted and moved to a new location by a human person.

13. The autonomous weed treating device of claim 12, wherein the model was trained by the neural network algorithm having a final layer to distinguish a boundary from a grassy terrain.

* * * * *